(12) United States Patent
Lung et al.

(10) Patent No.: US 10,915,248 B1
(45) Date of Patent: Feb. 9, 2021

(54) MEMORY DEVICE

(71) Applicant: MACRONIX INTERNATIONAL CO., LTD., Hsinchu (TW)

(72) Inventors: Hsiang-Lan Lung, Kaohsiung (TW); Hsin-Yi Ho, Hsinchu (TW)

(73) Assignee: MACRONIX INTERNATIONAL CO., LTD., Hsinchu (TW)

( * ) Notice: Subject to any disclaimer, the term of this patent is extended or adjusted under 35 U.S.C. 154(b) by 0 days.

(21) Appl. No.: 16/533,870

(22) Filed: Aug. 7, 2019

(51) Int. Cl.
*G06F 3/06* (2006.01)
*G06N 3/02* (2006.01)
*G06F 17/10* (2006.01)

(52) U.S. Cl.
CPC ............ *G06F 3/061* (2013.01); *G06F 3/0655* (2013.01); *G06F 3/0679* (2013.01); *G06F 17/10* (2013.01); *G06N 3/02* (2013.01)

(58) Field of Classification Search
CPC .............. G06F 3/06; G06F 17/00; G06N 3/02
USPC .......................................................... 711/154
See application file for complete search history.

(56) References Cited

U.S. PATENT DOCUMENTS

| | | | | |
|---|---|---|---|---|
| 6,404,976 | B1 * | 6/2002 | Kondoh | G11B 27/324 360/61 |
| 9,571,115 | B1 * | 2/2017 | Beukema | H03M 1/069 |
| 10,762,416 | B2 | 9/2020 | Jin | |
| 2005/0114076 | A1 * | 5/2005 | Lee | G01C 17/30 702/151 |
| 2006/0293831 | A1 * | 12/2006 | Yano | F02D 41/221 701/114 |
| 2009/0009194 | A1 * | 1/2009 | Seguine | G01D 5/24 324/684 |
| 2011/0248149 | A1 * | 10/2011 | Sato | H04N 5/374 250/214 P |
| 2013/0249526 | A1 * | 9/2013 | Lee | G05F 1/575 323/313 |
| 2015/0063030 | A1 * | 3/2015 | Park | G11C 8/08 365/185.12 |
| 2015/0236652 | A1 * | 8/2015 | Yang | H03F 1/0227 330/251 |
| 2015/0324685 | A1 | 11/2015 | Bohn et al. | |
| 2015/0347896 | A1 | 12/2015 | Roy et al. | |
| 2016/0169947 | A1 * | 6/2016 | De Fazio | H03M 1/66 327/59 |

(Continued)

FOREIGN PATENT DOCUMENTS

| | | |
|---|---|---|
| CN | 108304926 A | 7/2018 |
| TW | 201824092 A | 7/2018 |
| TW | 201921282 A | 6/2019 |

OTHER PUBLICATIONS

TW Office Action dated Jul. 17, 2020 in Taiwan application (No. 108130886).

*Primary Examiner* — Christopher B Shin
(74) *Attorney, Agent, or Firm* — McClure, Qualey & Rodack, LLP

(57) ABSTRACT

An embodiment of the present invention discloses a memory device. The memory device includes a memory controller, a calculation memory and a functional circuit. The calculation memory is coupled to the memory controller, and is configured to receive a plurality of first signals to output a plurality of second signals. Each of the second signals has a reference value. The functional circuit is coupled to the calculation memory, and is configured to indicate the second signal which has the greatest or the smallest reference value among the second signals.

12 Claims, 3 Drawing Sheets

(56) References Cited

U.S. PATENT DOCUMENTS

| | | | |
|---|---|---|---|
| 2016/0196488 A1* | 7/2016 | Ahn | G06N 3/049 |
| | | | 706/41 |
| 2016/0212365 A1* | 7/2016 | Kato | H04N 5/357 |
| 2017/0142516 A1* | 5/2017 | McCormack | H04R 3/00 |
| 2017/0213129 A1* | 7/2017 | Lee | G06N 3/049 |
| 2018/0183420 A1* | 6/2018 | Jang | H03K 5/24 |
| 2019/0080231 A1* | 3/2019 | Nestler | G06N 3/0481 |
| 2019/0228287 A1 | 7/2019 | Okazaki et al. | |
| 2019/0362224 A1* | 11/2019 | Kim | G06F 9/30021 |
| 2020/0020362 A1* | 1/2020 | Bae | G06F 3/0673 |
| 2020/0202204 A1 | 6/2020 | Kouno et al. | |

* cited by examiner

MEMORY DEVICE

BACKGROUND OF THE INVENTION

Field of the Invention

The invention relates to a memory device.

Description of the Related Art

Neural network is a system having abilities of learning, conclusion and induction. Neural network is widely applied in fields such as machine learning and artificial. However, huge amount of calculation of neutral network may need to be supported by hardware. In view of the above, it is a trend in the art to implement a neural network by means of a memory with high speed computing ability.

SUMMARY OF THE INVENTION

An embodiment of the present invention discloses a memory device. The memory device includes a memory controller, a calculation memory and a functional circuit. The calculation memory is coupled to the memory controller, and is configured to receive a plurality of first signals to output a plurality of second signals. Each of the second signals has a reference value. The functional circuit is coupled to the calculation memory, and is configured to indicate the second signal which has the greatest or the smallest reference value among the second signals.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1:
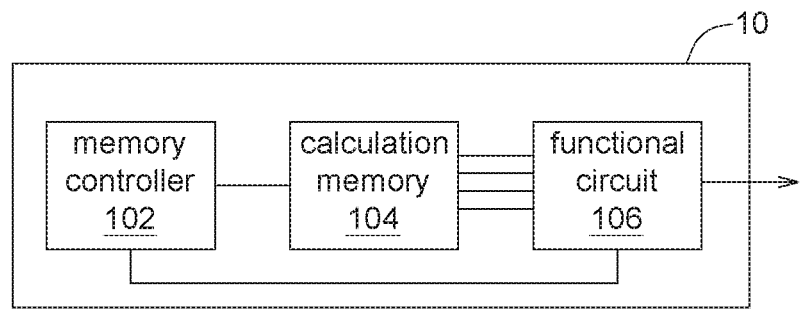
FIG. 1 shows a block diagram of a memory device according to an embodiment of the present invention.

Referring to FIG. 1, FIG. 1 shows a block diagram of a memory device according to an embodiment of the present invention. The memory device 10 includes a memory controller 102, a calculation memory 104 and a functional circuit 106. The memory device 10 may be used for implementing some specific calculations, e.g., convolution, of a neutral network and obtaining result(s) of interest by analyzing the calculation results.

The memory controller 102 is coupled to the calculation memory 104 and the functional circuit 106, and is configured to control the operation of the calculation memory 104 and the functional circuit 106.

Figure 2:
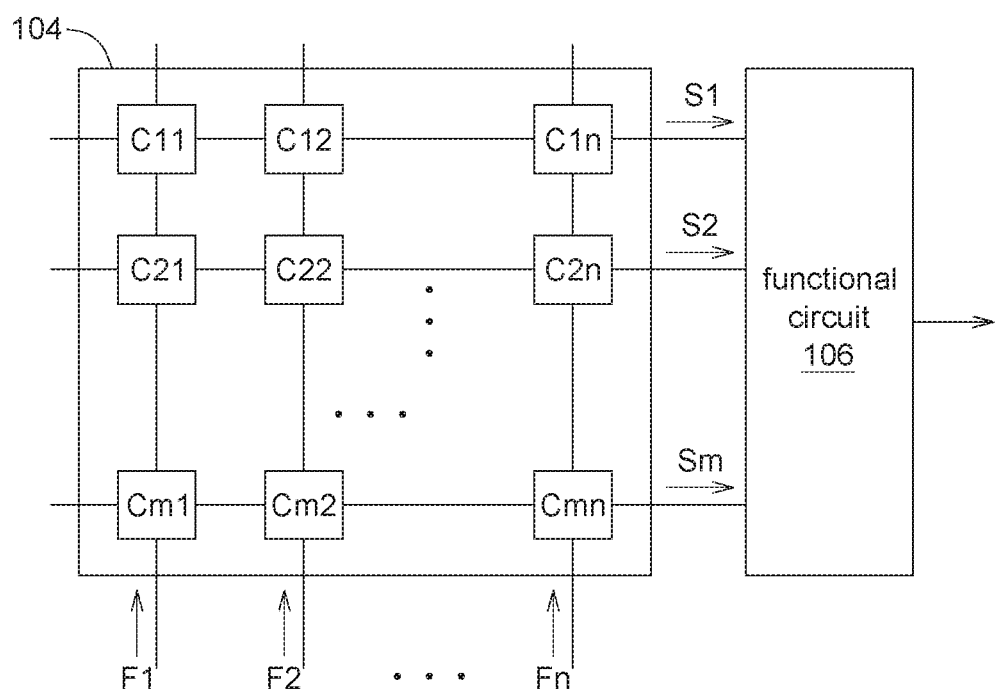
FIG. 2 shows a block diagram of a calculation memory.

The calculation memory 104 may be a non-volatile memory, for example, NAND flash memory, NOR flash memory and phase change memory. In an embodiment, the calculation memory 104 includes a number of memory cells C11~Cmn, wherein m and n are positive integers. Each of the memory cells may include a resistor. The resistance of each of the resistors represents a weight value, which may be used for implementing a Synapse of a neutral network. As shown in FIG. 2, the calculation memory 104 may be configured to receive a number of first signals F1~Fn, and output a number of second signals S1~Sm according to the first signals F1~Fn and the weight value represented by the memory cells C11~Cmn. Each of the second signals S1~Sm has a reference value. In an embodiment, while the second signals S1~Sm are current signals, the reference value is a current value. In another embodiment, while the second signals S1~Sm are voltage signals, the reference value is a voltage value. With the calculation memory 104, a mathematical calculation such as convolution may be implemented.

The functional circuit 106 is configured to receive the second signals S1~Sm, and indicate the second signal having the greatest reference value or the second signal having the smallest reference among the second signals S1~Sm. For example, while the second signals S1~Sm are current signals, the functional circuit 106 may be configured to indicate the second signal having the greatest current value or the second value having the smallest current value among the second signals S1~Sm; while the second signals S1~Sm are voltage signals, the functional circuit 106 may be configured to indicate the second signal having the greatest voltage value or the second value having the smallest voltage value among the second signals S1~Sm.

Figure 3:
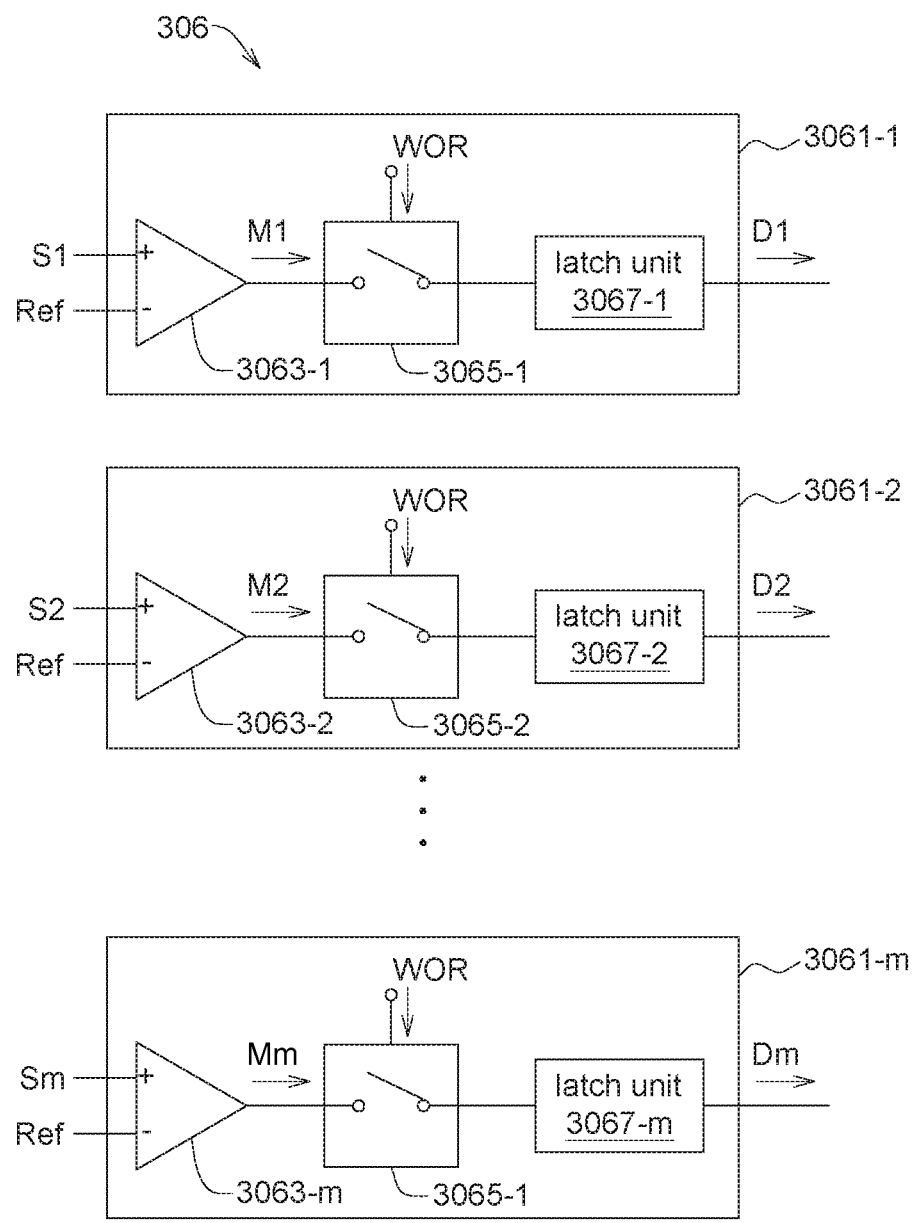
FIG. 3 shows a block diagram of a functional circuit according to an embodiment of the present invention.

Referring to FIG. 3, FIG. 3 shows a block diagram of a functional circuit according to an embodiment of the present invention. The functional circuit 306 includes a number of sub functional circuits 3061-1~3061-$m$. each of the sub functional circuits includes a comparison unit, a switch unit and a latch unit. For each of the sub functional circuit 3061-$k$ (wherein k=1~m), a first input node of the comparison unit 3063-$k$ is configured to receive one of the second signals S1~Sm (i.e., the second signal Sk), and a second input node of the comparison unit 3063-$k$ is configured to receive a reference signal Ref. An output node of the comparison unit 3063-$k$ is configured to output a first result signal M1 according to the received second signal Sk and the reference signal Ref. A first node of the switch unit 3065-$k$ is coupled to the output node of the comparison unit 3063-$k$. A control node of the switch unit 3065-$k$ is configured to receive a control signal WOR. A first node of the latch unit 3067-$k$ is coupled to a second node of the switch unit 3065-$k$. A second node of the latch unit 3067-$k$ is configured to output a result signal Dk. Taking the sub functional circuit 3061-1 as an example, the first input node of the comparison unit 3063-1 is a positive input node, the second input node of the comparison unit 3063-1 is a negative input node. When the second signal S1 is greater than the reference signal Ref, the first comparison result M1 output by the comparison unit 3063-1 is "1", i.e., logical high. When the second signal S1 is not greater than the reference signal Ref, the first comparison result M1 output by the comparison unit 3063-1 is "0", i.e., logical low. The switch unit 3065-1 is controlled by the control signal WOR, and the control signal WOR is generated according to all the first comparison results M1~Mm. When all the first comparison results M1~Mm are "0", the control signal WOR is "1", and the switch unit 3065-1 is turned on; when any of the first comparison results M1~Mm is "1", the control signal WOR is "0", and the switch unit 3065-1 is turned off. The latch unit 3067-1 may output the result signal D1 according to a clock signal. The operation of the other sub functional circuits 3061-2~3061-m are similar to the above description.

Next, the principle of the functional circuit 306 may be illustrated. In this embodiment, the second signals S1~Sm are voltage signals. The voltage value of the reference signal Ref is less than or equals to an upper bound and is greater than or equals to a lower bound. The upper bound and the lower bound may be determined based on a possible range of voltage value of the second signals S1~Sm. When a set of the second signals S1~Sm in output to the functional circuit 306, the voltage value of the reference signal Ref may decreases from the upper bound to the lower bound. Until any of the first comparison result becomes "1", the control signal WOR turns "0" from "1", and the switch units 3065-1~3065-m are turned off. All the first comparison results M1~Mm may be locked in the latch units 3067-1~3067-m, and then output according to the clock signal. In a practical example, assuming there are four second signals S1~S4 (i.e., m=4). The second signals S1~S4 are 4V, 5V, 2V and 3V respectively. The upper bound of the voltage of the reference signal Ref is 6V and the lower bound is 1V. When this set of the second signals S1~S4 is sent into the functional circuit 306, the voltage of the reference signal Ref may decreases from 6V to 1V. When the voltage of the reference signal Ref is not less than 5V, the first comparison results M1~M4 are "0", and the control signal WOR is "1". Until the voltage of the reference signal Ref is less than 5V, the first comparison result M2 corresponding to the second signal S2 (5V) becomes "1", the control signal WOR turns "0" from "1", and the switch units 3065-1~3065-4 are turned off. The current first comparison results M1~M4 may be locked in the latch units 3067-1~3067-4, and output as the result signals D1~D4. A circuit (not shown) which receives the result signals D1~D4 may access a memory address storing the second signal S2 according to the result signals D1~D4 to obtain the value of the second signal S2.

By the approach of the above embodiment, the functional circuit 306 may efficiently indicate the second signal having the greatest reference value among the second signals S1~Sm. In another embodiment, the functional circuit 306 may indicate the second value having the smallest reference value among the second signals S1~Sm if some modification are made to the functional circuit 306. For example, the negative input node of each of the comparison units 3063-k is configured to receive the corresponding second signal, the positive input node is configured to receive the reference signal Ref, and the reference value of the reference signal Ref increases from the lower bound to the upper bound.

In yet another embodiment, the reference value of the reference signal Ref changes according to an algorithm, for example, a divide-by-2 algorithm. In a practical example, assuming there are four second signals S1~S4 (i.e., m=4), 4V, 5V, 2V and 3V respectively. The upper bound of the voltage of the reference signal Ref is 6V, and the lower is 1V. When this set of the second signals S1~S4 is sent into the functional circuit 306, the voltage of the reference signal Ref may be set to an average value of the upper bound and the lower bound, i.e., 3.5V. The corresponding first comparison results M1, M2 are "1", and the first comparison results M3, M4 are "0". Next, the voltage of the reference signal Ref may change to an average value of the upper bound and 3.5V, i.e., 4.75V. The corresponding first comparison result M2 is "1", and the first comparison results M1, M3, M4 are "0". Since there is only the first comparison result M2 is "1", it may be determined that the corresponding second signal S2 has the greatest reference value among the second signals S1~S4. in this example, the control signal WOR may turns "0" from "1" while there is only one of the first comparison results is "1" and the other first comparison results are "0", to turn off the switch units and lock the current first comparison results into the latch units for outputting.

In other words, the reference value of the reference signal Ref may change linearly, nonlinearly, continuously or discontinuously.

Figure 4:
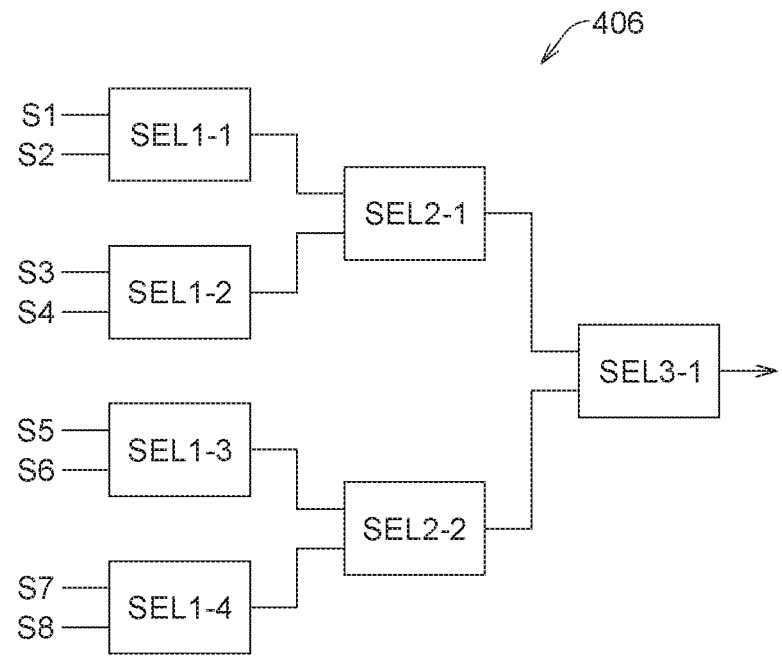
FIG. 4 shows a block diagram of a functional circuit according to another embodiment of the present invention.

Referring to FIG. 4, FIG. 4 shows a block diagram of a functional circuit according to another embodiment of the present invention. The embodiment takes m=8 as an example for illustrating, i.e., the amount of the second signals S1~S8 is 8. But the present invention is not limited thereby. The functional circuit 406 includes a number of selecting units SEL1-1~SEL1-4, SEL2-1~SEL2-2, SEL3-1. The selecting units SEL1-1~SEL1-4, SEL2-1~SEL2-2, SEL3-1 includes a number of stages. In this embodiment, the selecting units includes three stages, wherein the selecting units SEL1-1~SEL1-4 are a first stage, the selecting units SEL2-1~SEL2-2 are a second stage, and the selecting unit SEL3-1 is a third stage. The selecting units SEL1-1~SEL1-4 of the first stage are configured to respectively receive two of the second signals S1~S8. For example, the selecting unit SEL1-1 is configured to receive the second signals S1, S2, and select one of the second signals S1, S2 as an output according to a comparison of the reference values of the second signals S1, S2; the selecting unit SEL1-2 is configured to receive the second signals S3, S4, and select one of the second signal S3, S4 as an output according to a comparison of the reference values of the second signals S3, S4, and so on. The selecting units SEL2-1, SEL2-2 of the second stage are configured to respectively receive two of the outputs of the selecting units SEL1-1~SEL1-4. For example, the selecting unit SEL2-1 is configured to receive the outputs of the selecting units SEL1-1, SEL1-2, and select one of the outputs of the selecting units SEL1-1, SEL1-2 as an output according to a comparison of the reference values of the outputs of the selecting units SEL1-1, SEL1-2, and so on. The selecting unit SEL3-1 is configured to receive the outputs of the selecting units SEL2-1, SEL2-2, and select one of the outputs of the selecting units SEL2-1, SEL2-2 as an output according to a comparison of the reference values of the outputs of the selecting units SEL2-1, SEL2-2.

Figure 5:
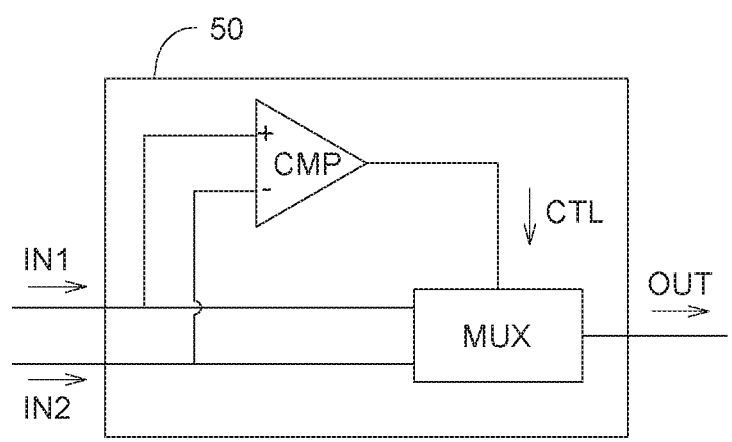
FIG. 5 shows a block diagram of a selecting unit according to an embodiment of the present invention.

For clearly illustrating the operation principle of the functional circuit 406, please refer to a block diagram of a selecting unit according to an embodiment of the present invention shown in FIG. 5. The selecting unit 50 shown in FIG. 5 may be applied to all the selecting units SEL1-1~SEL1-4, SEL2-1~SEL2-2, SEL3-1 shown in FIG. 4. The selecting unit 50 includes a multiplexer MUX and a comparator CMP. The multiplexer MUX includes two input nodes, a control node and an output node. The comparator CMP includes two input nodes and an output node. The output node of the comparator CMP is coupled to the control node of the multiplexer MUX. The two input nodes of the comparator CMP is configured to receive two signals IN1, IN2 which are input to the two input nodes of the multiplexer MUX. The output node of the comparator CMP is configured to output a control signal CTL generated according to a comparison of the reference values of the two signals IN1, IN2 which are input to the two input nodes of the multiplexer MUX. The multiplexer MUX select one of the signals IN1, IN2 which are input to the multiplexer MUX as an output signal OUT according to the control signal CTL. For example, when the signals IN1, IN2 are current signals, the comparator CMP compares the current values (i.e., the reference signals) of the signals IN1, IN2. If the current value of the signal IN1 is greater than the current value of the signal IN2, the comparator CMP outputs "1" as the control signal CTL; if the current value of the signal IN1 is not greater than the current value of the signal IN2, the comparator CMP outputs "0" as the control signal CTL. When the control signal CTL is "1", the multiplexer MUX selects IN1 as the output signal OUT; when the control signal CTL is "0", the multiplexer MUX selects signal IN2 as the output signal OUT. That is, the output signal OUT is a signal which has a greater reference value between the signals IN1, IN2, and the signal output by the selecting unit SEL3-1 of the third stage of the functional circuit 406 in FIG. 4 is the second signal which has the greatest reference value among the second signals S1~S8. In another embodiment, the selecting unit 50 may be configured to obtain the signal which has a smaller reference value between the signals IN1, IN2 if a modification is made. For example, when the control signal CTL is "0", the multiplexer MUX selects the signal IN1 as the output signal OUT; when the control signal CTL is "1", the multiplexer MUX selects signal IN2 as the output signal OUT, and the functional circuit 406 may be configured to output the second signal which has the smallest reference value among the second signals S1~S8.

Noted that the above embodiments are exemplary, the amount of the stages of the selecting units may depend on the amount of the second signals. For example, when there are 16 second signals, the selecting units may include 4 stages, and 15 selecting units in total; when there are 32 second signals, the selecting units may include 5 stages, and 31 selecting units in total.

In conclusion, the memory device according to the present invention can indicate the second signal which has the greatest of the smallest reference value among the second signals output by the calculation memory by the functional circuit. In an embodiment, the functional circuit compares the second signals with a variable reference signal to indicates the second signal which has the greatest or the smallest reference value. In another embodiment, the functional circuit compares the second signals two by two to indicates the second signal which has the greatest or the smallest reference value.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A memory device, including:
   a calculation memory, comprising a plurality of memory cells, wherein each of the memory cells comprises a resistor representing a weight value which is used for implementing a synapse of a neutral network, a plurality of columns of the memory cells are configured to receive a plurality of first signals, a plurality of rows of the memory cells are configured to output a plurality of second signals, and each of the second signals has a reference value; and
   a functional circuit, coupled to the calculation memory, and configured to indicate the second signal which has the greatest or the smallest reference value among the second signals.

2. The memory device according to claim 1, wherein the functional circuit compares the second signals with a reference signal respectively to indicate the second signal which has the greatest or the smallest reference value among the second signals, wherein the reference signal is variable.

3. The memory device according to claim 2, wherein the functional circuit includes:
   a plurality of sub functional circuits, and each of the sub functional circuits includes:
      a comparison unit, including two input nodes and an output nodes, the input nodes configured to receive one of the second signals and the reference signal, and the output node configured to output a first comparison result;
      a switch unit, including a first node, a second node and a control node, the first node coupled to the output node of the comparison unit, the control node configured to receive a control signal to turn on or off the switch unit; and
      a latch unit, including a first and a second node, the first node coupled to the second node of the switch unit, and the second node configured to output a result signal.

4. The memory device according to claim 3, wherein the reference signal has an upper bound and a lower bound, and the reference signal decreases from the upper bound to the lower bound.

5. The memory device according to claim 3, wherein the reference signal has an upper bound and a lower bound, and the reference signal increases from the lower bound to the upper bound.

6. The memory device according to claim 3, wherein the reference signal changes according to a divide-by-two algorithm.

7. The memory device according to claim 3, wherein the control signal is generated according to the first comparison results, and the result signals is configured to indicate a memory address storing the second signal which has the greatest or the smallest reference value among the second signals.

8. The memory device according to claim 7, wherein the switch units are turned on when the first result signals are logical low, and the switch units are turned off when one of the first result signals is logical high and others are logical low.

9. The memory device according to claim 1, wherein the functional circuit compares the second signals two-by-two to indicate the second signal which has the greatest or the smallest reference value among the second signals.

10. The memory device according to claim 9, wherein the functional circuit includes:
    a plurality of selecting units, including a plurality of stages, wherein each of the selecting units of a first stage of the stages is configured to receive two of the second signals, the selecting units of a last stage of the stages is configured to receive outputs of the second signals of a previous stage, to output the second signal which has the greatest or the smallest reference value among the second signals.

11. The memory device according to claim 10, wherein each of the selecting units includes:
    a multiplexer, including two input nodes, an output node and a control node; and
    a comparator, including two input nodes and an output nodes, the two input nodes of the comparator configured to receive two signals which are input to the two input nodes of the multiplexer, the output node of the comparator coupled to the control node of the multiplexer, and configured to output a control signal.

12. The memory device according to claim 11, wherein the comparator generates the control signal by comparing the two signals which are input to the two input nodes of the multiplexer, and the multiplexer selects one of the two signals which are input to the two input nodes of the multiplexer to output from the output node of the multiplexer according to the control signal.

\* \* \* \* \*